US011958104B2

(12) United States Patent
Zhang et al.

(10) Patent No.: US 11,958,104 B2
(45) Date of Patent: Apr. 16, 2024

(54) SLURRYING DEVICE FOR SEMI-SOLID SLURRY

(71) Applicant: ZHUHAI RUNXINGTAI ELECTRICAL CO., LTD., Zhuhai (CN)

(72) Inventors: Ying Zhang, Zhuhai (CN); Jicheng Wang, Zhuhai (CN); Gunan Li, Zhuhai (CN); Bingfeng Liu, Zhuhai (CN); Yong Wang, Zhuhai (CN); Huaide Ren, Zhuhai (CN)

(73) Assignee: ZHUHAI RUNXINGTAI ELECTRICAL CO., LTD., Zhuhai (CN)

( * ) Notice: Subject to any disclaimer, the term of this patent is extended or adjusted under 35 U.S.C. 154(b) by 601 days.

(21) Appl. No.: 17/201,662

(22) Filed: Mar. 15, 2021

(65) Prior Publication Data

US 2021/0197250 A1 Jul. 1, 2021

Related U.S. Application Data

(63) Continuation-in-part of application No. PCT/CN2019/076225, filed on Feb. 27, 2019.

(30) Foreign Application Priority Data

Dec. 14, 2018 (CN) ........................ 201811530277.X

(51) Int. Cl.
*B01F 27/95* (2022.01)
*B01F 27/00* (2022.01)
(Continued)

(52) U.S. Cl.
CPC .............. *B22D 1/005* (2013.01); *B01F 27/00* (2022.01); *B01F 27/95* (2022.01); *B01F 35/00* (2022.01); *B22D 17/007* (2013.01); *B22D 17/20* (2013.01)

(58) Field of Classification Search
CPC ...... B22D 1/005; B22D 17/007; B22D 17/20; B22D 17/28; B22D 1/00; B01F 27/00; B01F 27/95; B01F 35/00; B01F 27/951
(Continued)

(56) References Cited

U.S. PATENT DOCUMENTS 1,762,081 A * 6/1930 Schleicher ............ A47J 43/044 366/288
4,310,253 A * 1/1982 Sada ...................... B01F 33/451 261/84
(Continued)

FOREIGN PATENT DOCUMENTS

CN 1485169 A 3/2004
CN 1819884 A 8/2006
(Continued)

OTHER PUBLICATIONS

The State Intellectual Property Office of People's Republic of China First Office Action for Application No. CN201811530277X Sep. 5, 2022 17 pages (with translation).
(Continued)

*Primary Examiner* — Charles Cooley
(74) *Attorney, Agent, or Firm* — ANOVA LAW GROUP, PLLC

(57) ABSTRACT

A slurrying device includes a slurrying tank and a rotor stirrer. The rotor stirrer includes a stirring drum, a transmission gear arranged at an end face of the stirring drum configured to face the slurrying tank, and a rotor stirring rod configured to extend from the stirring drum and into the slurrying tank to stir a slurrying liquid in the slurrying tank. The rotor stirring rod is meshed with the transmission gear and configured to revolve along a planar trajectory of the transmission gear while simultaneously rotating. The rotor stirrer further includes a driving device provided at the
(Continued)

stirring drum and configured to drive the rotor stirring rod to rotate via the transmission gear.

17 Claims, 3 Drawing Sheets

(51) Int. Cl.

| | |
|---|---|
| ***B01F 35/00*** | (2022.01) |
| ***B22D 1/00*** | (2006.01) |
| ***B22D 17/00*** | (2006.01) |
| *B22D 17/20* | (2006.01) |

(58) Field of Classification Search
USPC ........ 366/287–288, 64–67, 96–98, 241–252, 366/272, 309–313, 139
See application file for complete search history.

(56) References Cited

U.S. PATENT DOCUMENTS

| | | | | | |
|---|---|---|---|---|---|
| 4,786,184 | A * | 11/1988 | Berezkina | B01F 27/951 366/288 |
| 9,586,340 | B2 * | 3/2017 | Mori | B29B 7/183 |
| 2004/0055735 | A1 | 3/2004 | Hong et al. | |
| 2007/0291579 | A1 * | 12/2007 | Huffstetler | B29B 7/82 366/147 |
| 2021/0197250 | A1 * | 7/2021 | Zhang | B01F 35/00 |

FOREIGN PATENT DOCUMENTS

| | | | |
|---|---|---|---|
| CN | 103862003 | A | 6/2014 |
| CN | 105149549 | A | 12/2015 |
| CN | 105268933 | A | 1/2016 |
| CN | 105413539 | A | 3/2016 |
| CN | 106926365 | A | 7/2017 |
| CN | 206435121 | U | 8/2017 |
| CN | 206748736 | U | 12/2017 |
| CN | 108746540 | A | 11/2018 |
| CN | 208145857 | U | 11/2018 |
| CN | 110681291 | A * | 1/2020 |
| CN | 111729534 | A * | 10/2020 |
| CN | 115518555 | A * | 12/2022 |
| DE | 3701802 | A1 * | 8/1988 |
| IN | 205200471 | U | 5/2016 |
| JP | S55001089 | B | 1/1980 |
| JP | S61147826 | A | 7/1986 |
| JP | H09327755 | A | 12/1997 |
| JP | 2005238015 | A | 9/2005 |
| JP | 2008522831 | A | 7/2008 |
| JP | 3166360 | U | 3/2011 |
| KR | 100873414 | B1 | 12/2008 |
| RO | 116784 | B1 | 6/2001 |
| WO | 2018152746 | A1 | 8/2018 |

OTHER PUBLICATIONS

European Patent Office European Search Report for Application No. EP19814862.9-1103 Jun. 2, 2022 8 pages.
Japan Patent Office The Office Action for Application No. JP2021-520395 May 26, 2020 17 pages (with translation).
World Intellectual Property Organization (WIPO) International Search Report for PCT/CN2019/076225 Sep. 20, 2019 6 Pages.

* cited by examiner

SLURRYING DEVICE FOR SEMI-SOLID SLURRY

CROSS-REFERENCE TO RELATED APPLICATIONS

This application is a continuation-in-part of International Application No. PCT/CN2019/076225, filed on Feb. 27, 2019, which claims priority to Chinese Patent Application No. 201811530277.X filed in the CNIPA on Dec. 14, 2018 and entitled SLURRYING DEVICE FOR SEMI-SOLID SLURRY, the entire contents of both of which are incorporated herein by reference.

TECHNICAL FIELD

The embodiments of the present disclosure relate to, but are not limited to, the technical field of alloy semi-solid rheological die-casting formation, and in particular to a device for preparing semi-solid slurry.

BACKGROUND

As an advanced metal processing technology in the 21st century, the semi-solid forming technology has rapidly developed in recent years. The semi-solid rheological die-casting technology has profoundly changed the traditional die-casting mode, and the semi-solid forming technology has broken the traditional dendritic solidification mode. The granular structure increases the density of the cast, so the comprehensive performance of the cast is improved. During the semi-solid rheological die-casting process, the quality of the semi-solid slurry is a key factor for the semi-solid forming technology, and the accurate control on the temperature of the liquid alloy and the temperature of the semi-solid slurry is a technological basis for ensuring the quality of the semi-solid slurry. Researchers have conducted a lot of research on the methods for preparing semi-solid slurry and have proposed many processes for preparing semi-solid metal slurry, including mechanical stirring, electromagnetic stirring, controlled solidification, Strain Induced Melt Activation (SIMA), isothermal treatment, near-liquidus casting, spray deposition, powder metallurgy, and the like. Most of the slurrying methods are merely suitable for laboratory research and cannot be popularized in practical die-casting processes due to technical limitations.

At present, by common slurrying methods using mechanical stirring and argon cooling, 2 to 25 KG of slurry is generally prepared. With the enlargement of semi-solid die-cast products, thin-wall semi-solid products are 1200 mm in size and 15 to 30 KG in weight. Because of the weight of the products and the weight of slag ladles at a nozzle, 20 to 60 KG of semi-solid slurry is required to satisfy the production of large semi-solid products. In the conventional mechanical stirring methods, a stirring rod rotates and stirs at a given position in a slurrying tank. When there is a large amount of alloy liquid in the slurrying tank, the alloy liquid at a position far away from the stirring rod will not be stirred, dendritic crystals cannot be broken completely, and the cooling efficiency is low.

Therefore, the technical problem to be urgently solved in the art is to provide a slurrying device for semi-solid slurry, which improves slurrying capacity, prepares slurry with compact and fine crystal grains and uniform temperature and can be used for continuous die-casting production of large-size semi-solid products.

SUMMARY

The present disclosure is aimed at solving the problems described above. In view of the problems, an objective of the present disclosure is to provide a slurrying device for semi-solid slurry which is large in capacity and prepares uniform and stable slurry.

In accordance with one aspect of the present disclosure, a slurrying device for semi-solid slurry is provided, including a rotor stirrer and a slurrying tank. The rotor stirrer includes a stirring drum and at least one rotor stirring rod extending from the stirring drum into the slurrying tank. A driving device for driving the at least one rotor stirring rod to rotate is provided inside the stirring drum. A transmission gear is arranged on an end face of the stirring drum facing the slurrying tank. The at least one rotor stirring rod is meshed with the transmission gear. The at least one rotor stirring rod revolves along a planar trajectory of the transmission gear during its rotation. The transmission gear is provided with n teeth, with the distance between a previous tooth and a neighboring next tooth being a and the width of each tooth being b. Meshing teeth matched with the transmission gear are provided at an end of the at least one rotor stirring rod which is connected to the transmission gear, and each rotor stirring rod includes m meshing teeth, with the distance between a previous meshing tooth and a neighboring next meshing tooth being b and the width of each meshing tooth being a. The rotation and revolution of the at least one rotor stirring rod are performed simultaneously to stir slurrying liquid in the slurrying tank to obtain semi-solid slurry, with the grain size of the prepared semi-solid slurry being 30 to 50 μm and the grain roundness of the semi-solid slurry being 0.80 to 0.95.

Optionally, n is 500 to 2000.

Optionally, m is 10 to 20.

Optionally, a is 2 to 4 cm.

Optionally, b is 3 to 5 cm.

Optionally, the depth of the rotor stirring rod extending into the slurrying tank is ½ to ⅔ of the height of the slurrying tank.

Optionally, the speed of rotation of the rotor stirring rod is 1000 to 2000 rounds/min, and the speed of revolution of the rotor stirring rod along the planar trajectory of the transmission gear is 100 to 200 revolutions/min.

Optionally, the rotor stirring rod is of a hollow structure, the diameter of an outer wall of the rotor stirring rod is 50 to 70 mm, and the diameter of an inner wall of the rotor stirring rod is 30 to 50 mm.

Optionally, a copper tube extending through the stirring drum and into the stirring tank is arranged in an inner cavity of the rotor stirring rod, the copper tube has an outer diameter of 10 to 20 mm and an inner diameter of 1.5 to 5 mm, and the copper tube is used for feeding compressed argon into the rotor stirring rod.

Optionally, the slurrying liquid is metal melt, alloy melt or composite material melt containing more than 40% of metal or alloy, which is heated to melt.

Optionally, the rotor stirrer includes at least three rotor stirring rods extending from the stirring drum into the slurrying tank; at least three transmission gears are arranged on an end face of the stirring drum facing the slurrying tank; the at least three rotor stirring rods are in one-to-one correspondence to the at least three transmission gears and meshed with the at least three transmission gears; each of the rotor stirring rods revolves along a planar trajectory of the respective transmission gear during its rotation; the speed of rotation of each of the rotor stirring rods is 1200 to 2000 rounds/min, and the speed of revolution of each of the rotor stirring rods along the planar trajectory of the respective transmission gear is 120 to 180 revolutions/min; the rotation and revolution of the at least three rotor stirring rods are performed simultaneously to stir slurrying liquid in the slurrying tank to obtain semi-solid slurry; and, the grain size of the prepared semi-solid slurry is 35 to 50 and the grain roundness of the semi-solid slurry is 0.85 to 0.95.

Optionally, 20 to 80 kg of semi-solid slurry can be prepared in the slurrying tank, and the difference among temperatures of the semi-solid slurry at different locations in the slurrying tank is below 3° C.

Optionally, a permanent magnet is arranged in the slurrying tank, and a magnetic field force generated by the permanent magnet propels the slurrying liquid in the slurrying tank to be electrometrically stirred.

Optionally, 20 to 80 kg of semi-solid slurry can be prepared in the slurrying tank, and the difference among temperatures of the semi-solid slurry at different locations in the slurrying tank is below 1.5° C.

The slurrying device for semi-solid slurry provided by the present disclosure includes a rotor stirrer and a slurrying tank, wherein the slurrying tank can contain 20 to 80 kg of slurrying liquid, and the slurrying tank is 2 to 7.5 meters in length, 1.30 to 5.5 meters in width and 1 to 2.8 meters in depth. In order to avoid non-uniform slurrying caused by crystals on the wall of the slurrying tank, the slurrying tank may be shaped like a spoon.

In the slurrying device for semi-solid slurry provided by the present disclosure, the rotor stirring rod rotates in the slurrying liquid at a speed of 1000 to 2000 rounds/min and meanwhile revolves along the transmission gear at a speed of 100 to 200 revolutions/min, that is, the rotor stirring rod moves outward from the center of the slurrying tank along an arc trajectory. In this way, the rotor stirring rod generates a stirring force at any location in the slurrying tank to break the process of the slurrying liquid crystallizing and growing inward to form primary dendritic crystals, so that the crystal grains of the dendritic crystals are crushed or broken to form crystal grains having an average size of 0.01 to 0.04 mm. The crystal grains are uniform in nucleation and slow in growth, and the solid-phase crystal grains in the semi-solid slurry account for 50% to 70%. Accordingly, the high-quality semi-solid slurry containing fine and uniform solid-phase particles is obtained.

When the rotor stirring rod includes one rotor stirring rod, the rotor stirring rod revolves at a slow speed while rotating at a high speed, so that the alloy at 95% of locations in the slurrying tank is stirred. When the rotor stirring rod includes three rotor stirring rods, three rotor stirring rods rotate and stir the slurrying liquid at three locations of the slurrying tank, so that the alloy at 95% of locations in the slurrying tank is stirred, and the slurrying liquid in the slurrying tank is cooled under the action of the stirring force to generate low-temperature semi-solid granular crystal structures.

In the slurrying device for semi-solid slurry provided by the present disclosure, the transmission gear is provided with 500 to 2000 teeth, where the distance between a previous tooth and a neighboring next tooth is 2 to 4 cm and the width of each tooth is 3 to 5 cm. In the slurrying device for semi-solid slurry provided by the present disclosure, meshing teeth matched with the transmission gear are arranged at an end of the at least one rotor stirring rod connected to the transmission gear, and each rotor stirring rod includes 10 to 20 meshing teeth, where the distance between a previous meshing tooth and a neighboring next meshing tooth is 3 to 5 cm and the width of each meshing tooth is 2 to 4 cm. The meshing teeth of the rotor stirring rod are meshed with the teeth of the transmission gear to revolve along the trajectory of the transmission gear. During an alloy slurrying process, the stirring rod is easily damaged by corrosion. Since the stirring rod is meshed with the transmission gear, it is convenient for the replacement and maintenance of the stirring rod. As a result, the service life of the whole slurrying device can be prolonged by replacing the stirring rod, and the mounting accuracy of the stirring rod and the transmission gear is improved. Accordingly, the stirring rod is allowed to revolve along the trajectory of the transmission gear, and the centrifugal force generated during revolution acts on the slurrying liquid in the slurrying tank, so that the solidification process of the slurrying liquid is broken and the time required by the slurrying liquid to form the semi-solid slurry is reduced.

In another aspect, the slurrying device for semi-solid slurry provided by the present disclosure includes a rotor stirrer and a slurrying tank. The rotor stirrer includes a stirring drum, a transmission gear, a driving device and at least one rotor stirring rod. The at least one rotor stirring rod is connected to the stirring drum and located in the slurrying tank. The at least one rotor stirring rod is meshed with the transmission gear. The transmission gear is located on the bottom of the stirring drum. The driving device drives the at least one rotor stirring rod to rotate. The at least one rotor stirring rod revolves along a planar trajectory of the transmission gear while rotating.

Further, the rotor stirrer further includes a transmission rod and a power device; a stirring rail is arranged on the bottom of the stirring drum; a middle portion of the transmission rod is in transmission connection to the stirring rail; the transmission gear is connected to a bottom end of the transmission rod; and the power device is in transmission connection to a top end of the transmission rod to drive the transmission rod to drive the at least one rotor stirring rod to revolve along the planar trajectory of the transmission gear.

Further, the stirring rail includes a transmission rail and a sliding rail, and the transmission rod is in transmission connection to the transmission rail and in sliding connection to the sliding rail.

Optionally, the transmission rail is of an internally-toothed ring structure.

Further, a driving wheel is provided at the middle portion of the transmission rod, with the driving wheel being meshed with and in transmission connection to the transmission rail.

Optionally, a lug is provided at the middle portion of the transmission rod, with the lug being in sliding connection to the sliding rail.

Optionally, the rotor stirrer further includes a transmission frame, with the transmission frame being fixedly connected to the bottom end of the transmission rod and the at least on rotor stirring rod being rotatably connected to the transmission frame.

In some embodiments, the rotor stirring rod is of a hollow structure, the diameter of an outer wall of the rotor stirring rod is 50 to 70 mm, and the diameter of an inner wall of the rotor stirring rod is 30 to 50 mm.

In some embodiments, a copper tube is arranged in an inner cavity of the rotor stirring rod, the copper tube is of a cut-through hollow structure, the outer diameter of the copper tube is less than the inner diameter of the rotor stirring rod, and the copper tube is used for feeding compressed argon into the rotor stirring rod.

In some embodiments, a permanent magnet is arranged in the slurrying tank, and a magnetic field force generated by the permanent magnet propels slurrying liquid in the slurrying tank to be electrometrically stirred. The present disclosure is applicable to the preparation of large-capacity semi-solid slurry for rheological die-casting of various alloys such as aluminum, magnesium, copper and zinc. This mechanical stirring method using the combination of the rotation and revolution of the stirring rod exploits a new mode for the slurrying process in the semi-solid rheological die-casting production, broadens the design concept of the semi-solid slurrying device, and provides a new idea for the development of the mechanical rotary slurrying technology. The prepared semi-solid slurry has a grain roundness of 85% to 95%, a small grain size and moderate viscosity and fluidity, and is suitable for industrial die-casting formation, so that the production efficiency is improved. By controlling the speed of rotation and the speed of revolution of the rotor stirring rod, the quality and performance of the generated semi-solid slurry can be controlled to satisfy different requirements in different fields, and the range of application is widened.

In the slurrying device for semi-solid slurry provided by the present disclosure, the rotor stirring rod is of a hollow structure, and a copper tube running through the stirring drum is arranged in the hollow stirring rod. The copper tube is used for feeding compressed argon into the slurrying liquid in the slurrying tank and taking away part of heat around the rotor stirring rod through the flow of the compressed argon, so as to avoid the high-temperature heat loss of the rotor stirring rod, improve the utilization of the rotor stirring rod and prevent the rotor stirring rod from corrosion by the slurrying liquid to pollute the slurrying liquid. Meanwhile, the temperature of the slurrying liquid is reduced, the motion of the slurrying liquid and the time to form the semi-solid slurry are accelerated, the speed of solidification is quickened, and the production efficiency is improved. As a result, the nucleation of crystal grains in the slurry is more uniform to avoid phase segregation, and the finally obtained rheological slurry is good in quality, fine in overall grain size and uniform in distribution.

The compressed argon cools the slurrying liquid so that the temperature of the prepared semi-solid slurry satisfies the requirements for direct die-casting, and the subsequent water cooling step for reducing the temperature is omitted. As a result, the energy waste is reduced, the development requirements of green chemical industry are satisfied, the processing procedures are reduced, and the process cycle is shortened.

In the slurrying device for semi-solid slurry provided by the present disclosure, the fine grain structure can be obtained without adding any grain refiner, so the generation of columnar crystals and coarse dendritic crystals during the conventional casting process is eliminated, the forming temperature is low, the cost for production and operation is reduced, and the energy source is saved.

After formation, the industrial casts made of the semi-solid slurry prepared by the slurrying device for semi-solid slurry in the present disclosure are high in size precision, small in machining allowance and high in mode-filling capacity.

In the slurrying device for semi-solid slurry provided by the present disclosure, a permanent magnet is further arranged in the slurrying tank to generate an electromagnetic force for propelling the movement of the slurrying liquid in the slurrying tank to realize electromagnetic stirring, so that the slurrying liquid is stirred more completely and uniformly, the slurrying time is shortened, and the problems on the solidification of the slurrying liquid on the slurrying tank are further reduced.

In the slurrying device for semi-solid slurry provided by the present disclosure, by combining the mechanical stirring with the electromagnetic stirring, a new idea for stirring and forming the semi-solid slurry is provided, and unexpected effects are achieved. The grain roundness of the prepared semi-solid slurry is up to 88% to 96%, and the distribution of fine crystal grains is more uniform, and the difference among temperatures of the semi-solid slurry at different locations in the slurrying tank is below 1.5° C.

BRIEF DESCRIPTION OF THE DRAWINGS

The accompanying drawings that constitute a part of the present disclosure are used for providing further understanding of the present disclosure, and the illustrative embodiments of the present disclosure and the descriptions thereof are used for explaining the present disclosure and do not constitute any improper limitations to the present disclosure, in which.

DETAILED DESCRIPTION OF THE EMBODIMENTS

To make the objectives, technical solutions and advantages of the embodiments of the present disclosure clearer, the technical solutions of the present disclosure will be described below with embodiments of the present disclosure. Apparently, the embodiments described herein are some but not all of embodiments of the present disclosure. All other embodiments obtained on the basis of the embodiments of the present disclosure by a person of ordinary skill without paying any creative effort shall fall in the scope of the present disclosure. It is to be noted that the embodiments in the present application and the features in the embodiments can be combined with each other if there is no conflict.

The slurrying device for semi-solid slurry provided by the present disclosure will be described below in detailed with specific embodiments.

Figure 1:
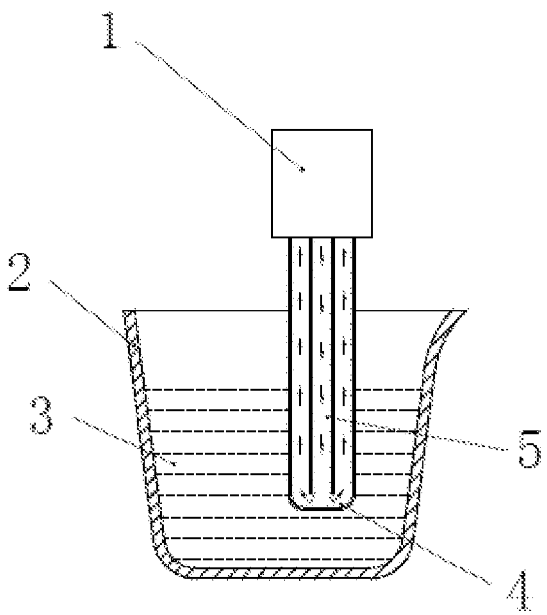
FIG. 1 is a schematic view of an example slurrying device for semi-solid slurry according to the present disclosure.
Figure 2:
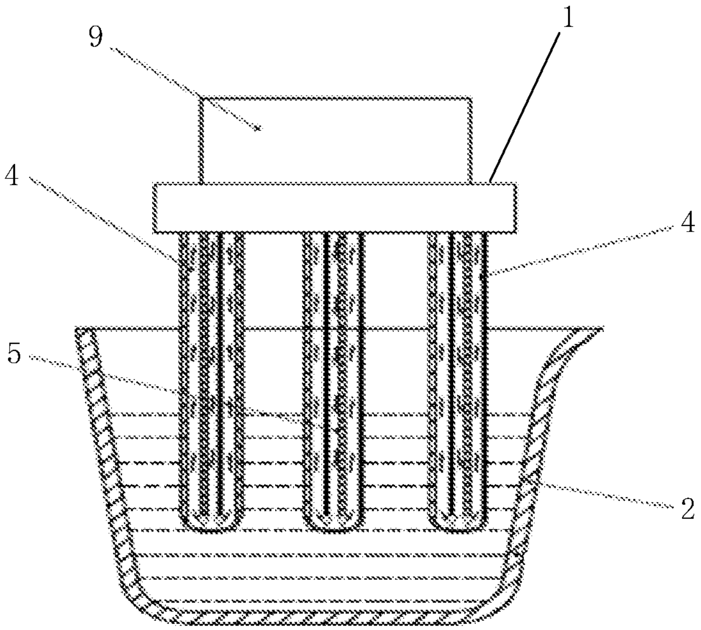
FIG. 2 is a schematic view of another example slurrying device for semi-solid slurry according to the present disclosure.

FIG. 1 is a schematic structural diagram of an example of the slurrying device according to the present disclosure, and FIG. 2 is a schematic structural diagram of another example of the slurrying device according to the present disclosure. As shown in FIGS. 1 and 2, the slurrying device for semi-solid slurry provided by the present disclosure includes a rotor stirrer 1 and a slurrying tank 2. The rotor stirrer 1 includes a stirring drum 9 and at least one rotor stirring rod 4 extending from the stirring drum 9 into the slurrying tank 2. Driving device for driving at least one rotor stirring rod 4 to rotate is provided at the stirring drum 9. A transmission gear 6 is provided on an end face of the stirring drum 9 facing the slurrying tank 2. The at least one rotor stirring rod 4 is meshed with the transmission gear 6, and the at least one rotor stirring rod 4 revolves along a planar trajectory of the transmission gear 6 during its rotation. In this disclosure, rotation or rotating of an object (e.g., a rotor stirring rod) refers to the circular motion of the object around its own axis, e.g., an axis passing through the center of mass of the object or an axis passing through a point near the center of mass of the object, while revolution or revolving of an object (e.g., a rotor stirring rod) refers to the circular motion of the object around another object (e.g., the transmission gear).

Figure 3:
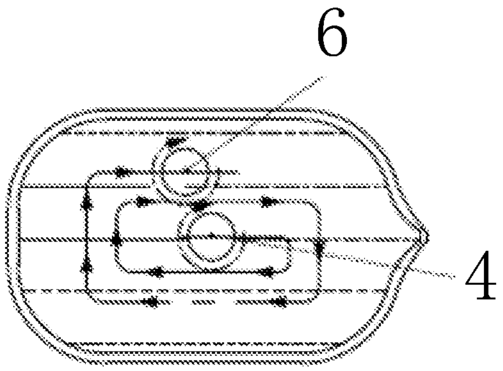
FIG. 3 schematically shows a movement trajectory of a rotor stirring rod of a rotor stirrer of a slurrying device for semi-solid slurry according to the present disclosure.
Figure 4:
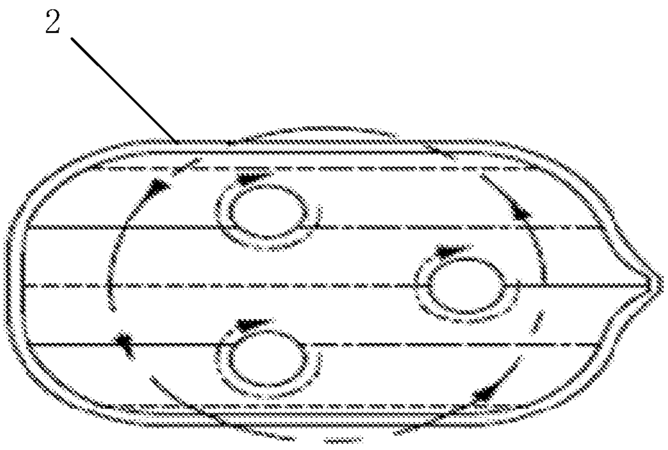
FIG. 4 schematically shows another movement trajectory of rotor stirring rods of another slurrying device according to the present disclosure.

In the embodiment shown in FIG. 1, the rotor stirrer 1 is provided with one rotor stirring rod; while in the embodiment shown in FIG. 2, the rotor stirrer 2 is provided with three rotor stirring rods 4. FIG. 3 shows a movement trajectory diagram of the at least one rotor stirring rod 4, for example, showing a movement trajectory of the one rotor stirring rod 4 shown in FIG. 1. FIG. 4 shows another movement trajectory diagram of the at least one rotor stirring rod 4, for example, movement trajectories of the three rotor stirring rods 4 shown in FIG. 4 moving at the same time.

The transmission gear is provided with n teeth, where n is a positive integer. The distance between a previous tooth and a neighboring next tooth is a, and the width of each tooth is b. A tooth of the transmission gear is also referred to as a "transmission tooth." A distance between two neighboring transmission teeth is also referred to as a "transmission tooth gap," and a width of a transmission tooth is also referred to as a "transmission tooth width." Meshing teeth matched with the transmission gear 6, i.e., matched with the transmission teeth of the transmission gear 6, are arranged at an end of the at least rotor stirring rod 4 which is connected to the transmission gear 6, and each rotor stirring rod 4 includes m meshing teeth, where m is a positive integer. The distance between a previous meshing tooth and a neighboring next meshing tooth (also referred to as a "meshing tooth gap") is b, and the width of each meshing tooth (also referred to as a "meshing tooth width") is a. That is, the transmission tooth gap approximately equals the meshing tooth width, and the transmission tooth width approximately equals the meshing tooth gap. The rotation and revolution of the at least one rotor stirring rod 4 are simultaneously performed to stir slurrying liquid 3 in the slurrying tank 2 to obtain semi-solid slurry. The grain size of the prepared semi-solid slurry is 30 to 50 μm, and the grain roundness of the semi-solid slurry is 0.80 to 0.95.

The n is 500 to 2000, in some embodiments 1000 to 1600. For example, in practical operations, it is possible that n=1000, n=1200, n=1400, n=1500 or n=1600.

The m is 10 to 20, in some embodiments 12 to 18. For example, in practical operations, it is possible that m=12, m=13, m=15, m=17 or m=18.

The a is 2 to 4 cm. For example, in practical operations, it is possible that a=2 cm, a=2.5 cm, a=3 cm, a=3.3 cm, a=3.8 cm or a=4 cm.

The b is 3 to 5 cm. For example, in practical operations, it is possible that b=3 cm, b=3.5 cm, b=4 cm, b=4.3 cm, b=4.8 cm or b=5 cm.

Under the conditions, the meshing teeth of the rotor stirring rod 4 are meshed with the teeth of the transmission gear 6 to revolve along the trajectory of the transmission gear 6. During an alloy slurrying process, the rotor stirring rod 4 may be easily damaged by corrosion. Since the rotor stirring rod 4 is meshed with the transmission gear 6, it is easy to disassemble and assemble, and it is convenient for the replacement and maintenance of the rotor stirring rod 4. As a result, the service of the whole device can be prolonged by replacing the rotor stirring rod 4, and the mounting accuracy of the rotor stirring rod 4 and the transmission gear 6 is improved. Accordingly, the rotor stirring rod 4 is allowed to revolve along the trajectory of the transmission gear 6, and the centrifugal force generated during revolution acts on the slurrying liquid 3 in the slurrying tank 2, so that the solidification process of the slurrying liquid 3 is broken and the time required by the slurrying liquid 3 to form the semi-solid slurry is reduced.

In some embodiments, the rotor stirrer 1 includes at least three rotor stirring rods 4 extending from the stirring drum 9 into the slurrying tank 2 (as shown in FIG. 2). At least three transmission gears 6 are provided on an end face of the stirring drum 9 facing the slurrying tank 2. The at least three rotor stirring rods 4 are in one-to-one correspondence to the at least three transmission gears 6 and meshed with the at least three transmission gears 6. Each rotor stirring rod 4 revolves along a planar trajectory of the respective transmission gear 6 during its rotation. The rotation of revolution of each of the at least three rotor stirring rods 4 are simultaneously performed to stir slurrying liquid 3 in the slurrying tank 2 to obtain semi-solid slurry. The grain size of the prepared semi-solid slurry is 35 to 50 and the grain roundness of the semi-solid slurry being 0.85 to 0.95. Under the conditions, the rotor stirring rods 4 can stir more than 95% of the slurrying liquid 3 in the slurrying tank 2 during its rotation, so that the slurrying liquid 3 is moved more fully. As a result, the prepared semi-solid slurry is smaller in size and higher in grain roundness, and the slurrying time can be further shortened.

Figure 5:
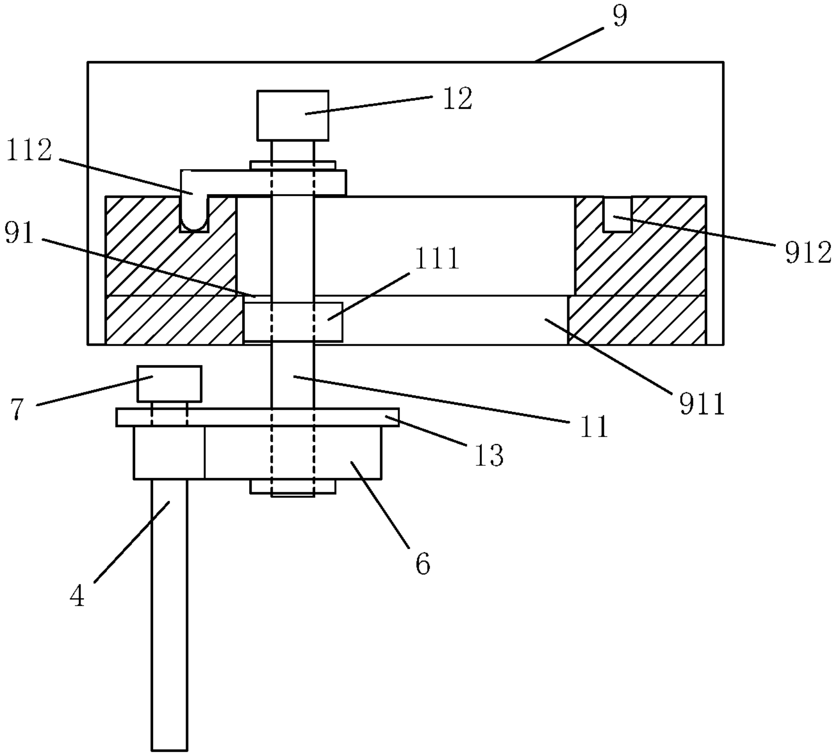
FIG. 5 is a schematic structural diagram of a rotor stirrer of a slurrying device according to the present disclosure.
Figure 6:
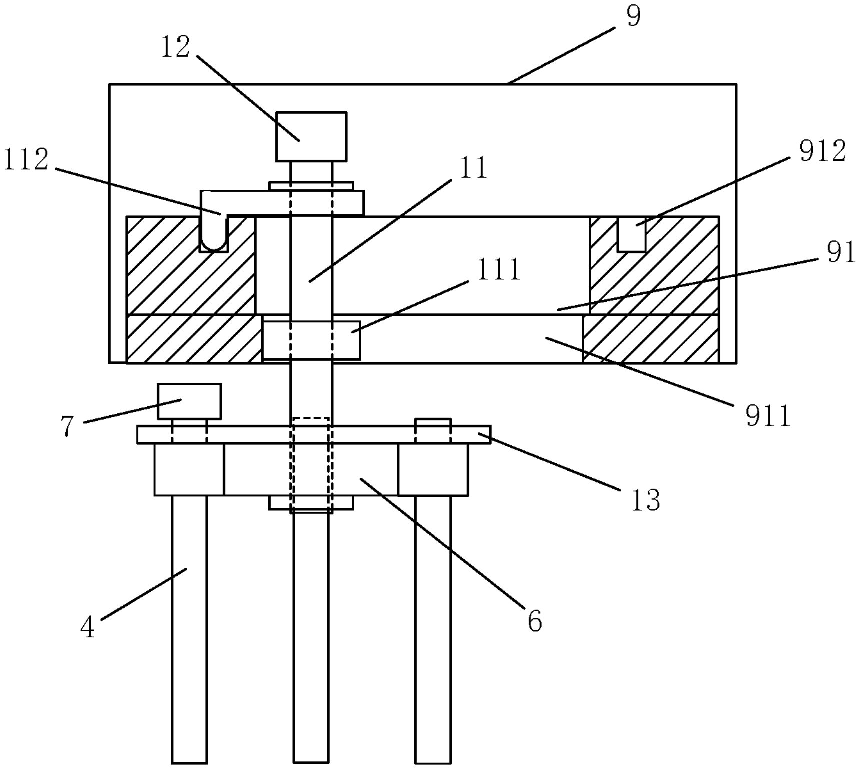
FIG. 6 is a schematic structural diagram of a rotor stirrer of another slurrying device according to the present disclosure.

FIG. 5 is a structural diagram of an example of the rotor stirrer 1 in the technical solution of the present disclosure, and FIG. 6 is a structural diagram of another example of the rotor stirrer 1. In the embodiment shown in FIG. 5, there is one rotor stirring rod 4; while in the embodiment shown in FIG. 6, there are three rotor stirring rods 4. As shown in FIGS. 5 and 6, the rotor stirrer 1 includes a stirring drum 9, a transmission gear 6, a driving device 7 and at least one rotor stirring rod 4. The at least one rotor stirring rod 4 is connected to the stirring drum 9 and located in the slurrying tank 2 to stir slurrying liquid in the slurrying tank 2. As shown, the at least one rotor stirring rod 4 is meshed with the transmission gear 6. The transmission gear 6 is located on the bottom of the stirring drum 9. The driving device 7 drives the at least one rotor stirring rod 4 to rotate. The at least one rotor stirring rod 4 revolves along a planar trajectory of the transmission gear 6 during its rotation.

In this embodiment, the rotor stirrer 1 further includes a transmission rod 11 and a power device 12, and a stirring rail 91 is arranged on the bottom of the stirring drum 9. A middle portion of the transmission rod 11 is in transmission connection to the stirring rail 91, the transmission gear 6 is rotatably connected to a bottom end of the transmission rod 11, and the power device 12 is in transmission connection to a top end of the transmission rod 11. The power device 12 drives the transmission rod 11 to move along the stirring rail 91, i.e., driving the transmission gear 6 to move along the stirring rail 91. That is, the movement trajectory of the transmission gear 6 is the movement trajectory of the transmission rod 11 along the stirring rail 91. The rotor stirring rod 4 is meshed with the transmission gear 6, so that the power device 12 drives the transmission rod 11 to drive the at least one rotor stirring rod 4 to revolve along the planar trajectory of the transmission gear 6. That is, the driving device 7 drives the rotor stirring rod 4 to rotate, and the power device 12 drives the rotor stirring rod 4 to revolve by means of the transmission rod 11 and the transmission gear 6. Thus, the rotation and revolution of the rotor stirring rod 4 in the slurrying liquid 3 are simultaneously performed to fully stir the slurrying liquid 3, the uniformity of slurrying is ensured, and it is advantageous to quickly reduce the temperature of the semi-solid slurry and improve the slurrying efficiency.

To ensure the stability of movement of the transmission rod 11 along the stirring rail 91, in this embodiment, the stirring rail 91 includes a transmission rail 911 and a sliding rail 912, and the transmission rod 11 is in transmission connection to the transmission rail 911 and in sliding connection to the sliding rail 912. In some embodiments, the transmission rail 911 may be an internally-toothed ring structure. Correspondingly, a driving wheel 111 is provided at the middle portion of the transmission rod 11, and the driving wheel 111 is meshed with and in transmission connection to the transmission rail 911. Further, a lug 112 is provided at the middle portion of the transmission rod 11, and the lug 112 is in sliding connection to the sliding rail 912.

In the embodiments shown in FIGS. 5 and 6, the orientation of the sliding rail 912 is parallel to the axial direction (longitudinal direction) of the transmission rod 11. In other embodiments, the orientation of the sliding rail 912 may also be perpendicular to the axial direction of the transmission rod 11 or be arranged at a preset included angle with the axial direction of the transmission rod 11.

Specifically, the trajectory of the sliding rail 912 is adapted to the trajectory of the transmission rail 911 in shape, and the central axis of the sliding rail 912 and the central axis of the transmission rail 911 overlap.

In a specific embodiment, if the transmission rail 911 is of an annular internally-toothed ring structure, the sliding rail 912 is of an annular rail structure that is coaxial with the transmission rail 911. Correspondingly, the lug 112 is of an arc-shaped or sector-shaped structure, to ensure the smoothness of sliding of the lug 112 in the sliding rail 912. Further, in this structure, the radius of the arc-shaped or sector-shaped structure of the lug 112 is matched with the radius of the sliding rail 912. For example, the inner diameter of the lug 112 is greater than or equal to that of the sliding rail 912, and the outer diameter of the lug 112 is less than or equal to that of the sliding rail 912.

During operation, to ensure the meshed connection between the rotor stirring rod 4 and the transmission gear 6, the rotor stirrer 1 further includes a transmission frame 13, the transmission frame 13 is fixedly connected to the bottom end of the transmission rod 11, and the at least one rotor stirring rod 4 is rotatably connected to the transmission frame 13. The driving device 7 drives the rotor stirring rod 4 to rotate. The power device 12 drives the rotor stirring rod 4 to revolve by means of the transmission frame 13 by driving the transmission rod 11 to move along the transmission rail 911. When there are two or more rotor stirring rods 4, for example, in the embodiment shown in FIG. 6, the driving device 7 drives one rotor stirring rod 4 to rotate, and other rotor stirring rods 4 can be driven to synchronously rotate by the transmission gear 6 by means of the meshed connection between the rotor stirring rods 4 and the transmission gear 6. Thus, the rotation of each rotor stirring rod 4 and the revolution of each rotor stirring rod 4 along the transmission rail 911 under the drive of the power device 12 are realized, and the slurrying liquid 3 is fully stirred to form slurry.

The depth of the rotor stirring rod 4 extending into the slurrying tank 2 is ½ to ⅔ of the height of the slurrying tank 2. In some embodiments, the depth of the rotor stirring rod 4 extending into the slurrying tank 2 is 7/12 to ⅔ of the height of the slurrying tank 2. Under this condition, the rotor stirring rod 4 can rotate the slurrying liquid 3 to the largest extent, thereby avoiding that the stirring efficiency of the semi-solid slurry is influenced by solidification since the rotor stirring rod 4 is not long enough to fully stir the slurrying liquid 3 on the bottom of the slurrying tank 2, and also avoiding that the quality of the prepared semi-solid slurry is influenced since the rotor stirring rod 4 is so long that the slurrying liquid 3 is excessively stirred during the stirring process so as to make air or other impurities enter into the slurrying liquid 3. For example, in practical applications, the depth of the rotor stirring rod 4 extending into the slurrying tank 2 is 7/12 or ⅔ of the height of the slurrying tank 2.

The speed of rotation of the rotor stirring rod 4 is 1000 to 2000 rounds/min. In some embodiments, the speed of rotation of the rotor stirring rod 4 is 1200 to 2000 rounds/min. Under this condition, the grain nucleation of the prepared semi-solid slurry is more uniform. The solid-phase crystal grains in the semi-solid slurry account for 50% to 70%, so the semi-solid slurry is high-quality semi-solid slurry containing fine and uniform solid-phase particles. For example, in practical operations, it is possible that the speed of rotation of the rotor stirring rod 4 is 1200 rounds/min, 1400 rounds/min, 1600 rounds/min, 1800 rounds/min or 2000 rounds/min.

The speed of revolution of the rotor stirring rod 4 along the planar trajectory of the transmission gear 6 is 100 to 200 revolutions/min. In some embodiments, the speed of revolution of the rotor stirring rod 4 along the planar trajectory of the transmission gear 6 is 120 to 180 revolutions/min. Under this condition, the rotor stirring rod 4 can generate a stirring force at any location in the slurrying tank 2 to break the process of the slurrying liquid 3 crystallizing and growing inward to form primary dendritic crystals, so that non-uniform slurrying caused by the crystallization of the slurrying liquid 3 on the wall of the slurrying tank 2 is avoided.

The rotor stirring rod 4 is of a hollow structure. The diameter of an outer wall of the rotor stirring rod 4 is 50 to 70 mm, and the diameter of an inner wall of the rotor stirring rod 4 is 30 to 50 mm. In some embodiments, the diameter of the outer wall of the rotor stirring rod 4 is 60 to 70 mm, and the diameter of the inner wall of the rotor stirring rod 4 is 30 to 40 mm. Under this condition, the contact area between the rotor stirring rod 4 and the slurrying liquid 3 is larger, the stirring time is less, and the process cycle is reduced. For example, in practical operations, it is possible that the diameter of the outer wall of the rotor stirring rod 4 is 60 mm and the diameter of the inner wall of the rotor stirring rod 4 is 30 mm; or, the diameter of the outer wall of the rotor stirring rod 4 is 65 mm and the diameter of the inner wall of the rotor stirring rod 4 is 35 mm; or, the diameter of the outer wall of the rotor stirring rod 4 is 70 mm and the diameter of the inner wall of the rotor stirring rod 4 is 40 mm.

In some embodiments, the rotor stirring rod 4 is made of graphite. Under this condition, the high-temperature corrosion of the rotor stirring rod 4 by the slurrying liquid 3 is avoided as much as possible, so that the service life of the rotor stirring rod 4 is prolonged, the utilization of the device is improved and the pollution of the slurrying liquid 3 caused by the corrosion of the rotor stirring rod 4 is avoided.

A copper tube 5 extending through the stirring drum 9 and into the stirring tank is arranged in an inner cavity of the rotor stirring rod 4. The copper rube 5 is of a cut-through hollow structure. As shown in FIGS. 1 and 2, the outer diameter of the copper tube 5 is less than the inner diameter of the rotor stirring rod 4. In some embodiments, the copper tube 5 has an outer diameter of 10 to 20 mm and an inner diameter of 1.5 to 5 mm. The copper tube 5 is used for feeding compressed argon into the rotor stirring rod 4, to conduct heat of the rotor stirring rod 4 and further quickly reduce the temperature of the semi-solid slurry (i.e., the slurrying liquid 3). In some embodiments, the copper tube 5 has an outer diameter of 15 to 20 mm and an inner diameter of 3 to 5 mm. For example, in practical operations, it is possible that the copper tube 5 has an outer diameter of 15 mm and an inner diameter of 3 mm, or an outer diameter of 16 mm and an inner diameter of 3.5 mm, or an outer diameter of 17 mm and an inner diameter of 4 mm, or an outer diameter of 18 mm and an inner diameter of 4.5 mm, or an outer diameter of 20 mm and an inner diameter of 5 mm.

The slurrying liquid 3 is metal melt, alloy melt or composite material melt containing more than 40% of metal or alloy, which is heated to melt. In some embodiments, the slurrying liquid 3 is one or more of aluminum alloy liquid, magnesium alloy liquid, copper alloy liquid and titanium alloy liquid. Under this condition, the prepared semi-solid slurry is high in die-casting formation ratio, and the obtained die cast is lighter in mass and smaller in thickness and has excellent mechanical properties (such as strength and tensile strength) and excellent electrical conductivity and thermal conductivity.

20 to 80 kg of semi-solid slurry can be prepared in the slurrying tank 2, and the difference among temperatures of the semi-solid slurry at different locations in the slurrying tank 2 is below 3° C. In some embodiments, 20 to 60 kg of semi-solid slurry is prepared in the slurrying tank 2. Under this condition, the difference among temperatures of the prepared semi-solid slurry at different locations in the slurrying tank 2 is below 1.5° C. For example, in practical operations, it is possible that 20, 30, 40, 50 or 60 kg of semi-solid slurry can be prepared.

A permanent magnet is arranged in the slurrying tank 2, and a magnetic field force generated by the permanent magnet propels the slurrying liquid 3 in the slurrying tank 2 to be electromagnetically stirred.

It is to be noted that, as used herein, the term "comprise," "include" or any other variant thereof is intended to cover any non-exclusive inclusion, so that an article or device including a series of elements not only includes these elements, but also includes other elements that are not expressly listed, or elements inherent to this article or device. Without further restrictions, an element defined by the statement "comprising . . . " does not exclude the presence of other identical elements in the article or device including this element.

The foregoing embodiments are merely for describing the technical solutions of the present disclosure rather than limiting, and the present disclosure merely has been described above in detail with embodiments. It should be understood by a person of ordinary skill in the art that the technical solutions of the present disclosure can still be modified or equivalently replaced, and these modifications or replacements made without departing from the spirit and scope of the technical solutions of the present disclosure shall fall into the scope of the present disclosure.

INDUSTRIAL APPLICABILITY

In the slurrying device for semi-solid slurry provided by the present disclosure, the fine grain structure can be obtained without adding any grain refiner, so the generation of columnar crystals and coarse dendritic crystals during the conventional casting process is eliminated, the forming temperature is low, the cost for production and operation is reduced, and the energy source is saved.

After formation, the industrial casts made of the semi-solid slurry prepared by the slurrying device for semi-solid slurry in the present disclosure are high in size precision, small in machining allowance and high in mode-filling capacity.

In the slurrying device for semi-solid slurry provided by the present disclosure, a permanent magnet is further arranged in the slurrying tank to generate an electromagnetic force for propelling the movement of the slurrying liquid in the slurrying tank to realize electromagnetic stirring, so that the slurrying liquid is stirred more completely and uniformly, the slurrying time is shortened, and the problems on the solidification of the slurrying liquid on the slurrying tank are further reduced.

In the slurrying device for semi-solid slurry provided by the present disclosure, by combining the mechanical stirring with the electromagnetic stirring, a new idea for stirring and forming the semi-solid slurry is provided, and unexpected effects are achieved. The grain roundness of the prepared semi-solid slurry is up to 88% to 96%, and the distribution of fine crystal grains is more uniform, and the difference among temperatures of the semi-solid slurry at different locations in the slurrying tank is below 1.5° C.

The invention claimed is:

1. A slurrying device comprising:
a slurrying tank; and
a rotor stirrer including:
a stirring drum;
a transmission gear arranged at an end face of the stirring drum configured to face the slurrying tank;
a rotor stirring rod configured to extend from the stirring drum and into the slurrying tank to stir a slurrying liquid in the slurrying tank, the rotor stirring rod being meshed with the transmission gear and configured to revolve along a planar trajectory of the transmission gear while simultaneously rotating;
a driving device provided at the stirring drum and configured to drive the rotor stirring rod to rotate via the transmission gear;
a transmission rod, the transmission gear being connected to a bottom end of the transmission rod;
a power device in transmission connection to a top end of the transmission rod to drive the transmission rod to drive the rotor stirring rod to revolve along the planar trajectory of the transmission gear; and
a stirring rail arranged at a bottom of the stirring drum, a middle portion of the transmission rod being in transmission connection to the stirring rail, the stirring rail including a transmission rail and a sliding rail, and the transmission rod being in transmission connection to the transmission rail and in sliding connection to the sliding rail.

2. The slurrying device according to claim 1, wherein:
the transmission gear includes a plurality of transmission teeth;

the rotor stirring rod includes a plurality of meshing teeth configured to mesh with the transmission teeth;

a meshing tooth gap between neighboring ones of the meshing teeth approximately equals a transmission tooth width of each of the transmission teeth; and a meshing tooth width of each of the meshing teeth approximately equals a transmission tooth gap between neighboring ones of the transmission teeth.

3. The slurrying device according to claim 2, wherein:

the plurality of transmission teeth include 500 to 2000 transmission teeth;

the plurality of meshing teeth include 10 to 20 meshing teeth;

the transmission tooth gap is 2 to 4 cm; and the transmission tooth width is 3 to 5 cm.

4. The slurrying device according to claim 1, wherein the rotor stirring rod is configured to extend into the slurrying tank by ½ to ⅔ of a height of the slurrying tank.

5. The slurrying device according to claim 1, wherein the rotor stirring rod is configured to rotate at 1000 to 2000 rounds/min, and to revolve along the planar trajectory of the transmission gear at 100 to 200 revolutions/min.

6. The slurrying device according to claim 1, wherein the rotor stirring rod has a hollow structure, a diameter of an outer wall of the rotor stirring rod is 50 to 70 mm, and a diameter of an inner wall of the rotor stirring rod is 30 to 50 mm.

7. The slurrying device according to claim 6, wherein the rotor stirrer further includes a copper tube extending through the stirring drum and arranged in an inner cavity of the rotor stirring rod, the copper tube has a cut-through hollow structure and is configured to feed compressed argon into the rotor stirring rod, and an outer diameter of the copper tube is smaller than the diameter of the inner wall of the rotor stirring rod.

8. The slurrying device according to claim 7, wherein the outer diameter of the copper tube is 10 to 20 mm and an inner diameter of the copper tube is 1.5 to 5 mm.

9. The slurrying device according to claim 1, wherein:

the rotor stirring rod is one of at least three rotor stirring rods of the rotor stirrer that are configured to extend from the stirring drum into the slurrying tank;

the transmission gear is one of at least three transmission gears of the rotor stirrer are arranged at the end face of the stirring drum;

the at least three rotor stirring rods are in one-to-one correspondence to the at least three transmission gears and each meshed with a corresponding transmission gear of the at least three transmission gears;

each of the at least three rotor stirring rods is configured to revolve along a planar trajectory of the corresponding transmission gear at 120 to 180 revolutions/min while simultaneously rotating at 1200 to 2000 rounds/min.

10. The slurrying device according to claim 1, wherein the slurrying liquid includes at least one of metal melt, alloy melt, or composite material melt containing more than 40% of metal or alloy.

11. The slurrying device according to claim 1, wherein the rotor stirring rod is configured to stir the slurrying liquid in the slurrying tank to prepare a semi-solid slurry having a grain size of 30 to 50 μm and a grain roundness of 0.80 to 0.95.

12. The slurrying device according to claim 1, wherein:

the slurrying tank has a volume that is capable of preparing 20 to 80 kg of semi-solid slurry; and a difference among temperatures of the semi-solid slurry at different locations in the slurrying tank is below 3° C.

13. The slurrying device according to claim 1, wherein the transmission rail has an internally-toothed ring structure.

14. The slurrying device according to claim 1, wherein the rotor stirrer further includes a driving wheel provided at the middle portion of the transmission rod, and the driving wheel is meshed with and in transmission connection to the transmission rail.

15. The slurrying device according to claim 1, wherein the rotor stirrer further includes a lug provided at the middle portion of the transmission rod, and the lug is in sliding connection to the sliding rail.

16. The slurrying device according to claim 1, wherein:

the rotor stirrer further includes a transmission frame fixedly connected to the bottom end of the transmission rod; and the rotor stirring rod is rotatably connected to the transmission frame.

17. A rotor stirrer comprising:

a stirring drum;

a transmission gear arranged at an end face of the stirring drum;

a rotor stirring rod configured to extend from the stirring drum, the rotor stirring rod being meshed with the transmission gear and configured to revolve along a planar trajectory of the transmission gear while simultaneously rotating;

a driving device provided at the stirring drum and configured to drive the rotor stirring rod to rotate via the transmission gear;

a transmission rod, the transmission gear being connected to a bottom end of the transmission rod;

a power device in transmission connection to a top end of the transmission rod to drive the transmission rod to drive the rotor stirring rod to revolve along the planar trajectory of the transmission gear; and a stirring rail arranged at a bottom of the stirring drum, a middle portion of the transmission rod being in transmission connection to the stirring rail, the stirring rail including a transmission rail and a sliding rail, and the transmission rod being in transmission connection to the transmission rail and in sliding connection to the sliding rail.

* * * * *